United States Patent
Shimada

[19]

[11] Patent Number: 5,866,866
[45] Date of Patent: Feb. 2, 1999

[54] INVERTER SEAM RESISTANCE WELDING ELECTRIC POWER SUPPLY APPARATUS

[75] Inventor: Hiroshi Shimada, Chiba-ken, Japan

[73] Assignee: Miyachi Technos Corporation, Chiba-ken, Japan

[21] Appl. No.: 716,104

[22] Filed: Sep. 19, 1996

[30] Foreign Application Priority Data

Sep. 20, 1995 [JP] Japan ................................ 7-266295

[51] Int. Cl.⁶ .................................................. B23K 11/24
[52] U.S. Cl. ................................................... 219/110
[58] Field of Search ................................ 219/108, 109, 219/110

[56] References Cited

U.S. PATENT DOCUMENTS

| | | | |
|---|---|---|---|
| 4,562,330 | 12/1985 | Hamilton | 219/110 |
| 4,677,272 | 6/1987 | Tajiri | 219/110 |
| 4,734,556 | 3/1988 | Namiki | 219/110 |
| 4,734,640 | 3/1988 | Kitahori et al. | 219/109 X |
| 4,792,656 | 12/1988 | Namiki et al. | 219/110 |
| 4,910,375 | 3/1990 | Izume | 219/110 |
| 5,360,959 | 11/1994 | Takano et al. | 219/110 |
| 5,406,045 | 4/1995 | Kiriishi et al. | 219/110 |

FOREIGN PATENT DOCUMENTS

| | | | |
|---|---|---|---|
| 54-134050 | 10/1979 | Japan | 219/110 |
| 60-137582 | 7/1985 | Japan | 219/110 |
| 3-151175 | 6/1991 | Japan | 219/110 |
| 4-333381 | 11/1992 | Japan | 219/110 |
| 5-177362 | 7/1993 | Japan | 219/110 |
| 5-305453 | 11/1993 | Japan | 219/110 |

*Primary Examiner*—Gregory L. Mills
*Attorney, Agent, or Firm*—Wenderoth, Lind & Ponack, L.L.P.

[57] ABSTRACT

In order to improve the quality of seam welding, an inverter seam resistance welding electric power supply apparatus reliably determines local weldability (conforming/defective) of seam welding by simply monitoring welding current. In a seam welding operation, when a current monitor time interval has elapsed, a CPU reads, from storage, measured current values $[I_1]$, $[I_2]$, etc., of each inverter cycle obtained during the current monitor time interval and computes an average current value $[I_{M1}]$ thereof, according to an averaging method such as an arithmetic mean method. Then the CPU compares the average current value $[I_{M1}]$ with a preselected monitoring value or range. If the average current value $[I_{M1}]$ falls within the monitoring range, the CPU determines the occurrence of a conforming local welding whereas it determines the occurrence of a defective local welding if the average current value goes out of the monitoring range. For successive determinations of defective local welding for a preselected number of times, for instance, three, the CPU determines that a defective seam welding has occurred, and takes appropriate action immediately, for instance, by stopping the seam welding operation.

4 Claims, 6 Drawing Sheets

| MONITOR INTERVAL | $T_1$ | $T_2$ | $T_3$ | $T_4$ | $T_5$ | $T_6$ | $T_7$ | $T_8$ | $T_9$ | $T_{10}$ | $T_{11}$ | .... |
|---|---|---|---|---|---|---|---|---|---|---|---|---|
| LOCAL WELDING | OK | NG | OK | OK | NG | NG | NG | OK | OK | NG | NG | .... |
| SEAM WELDING | | | | | | | NG | | | | | |

INVERTER SEAM RESISTANCE WELDING ELECTRIC POWER SUPPLY APPARATUS

BACKGROUND OF THE INVENTION

The present invention relates to an inverter resistance welding electric power supply apparatus for seam welding.

Seam welding is a process in which a pair of relatively thin metal plates are weld-jointed continuously or intermittently forming a seamlike welded line or lines. Seam welding may be applied to seaming metal housings of dry cells and semiconductor devices, fuel tank, etc.

FIG. 7 illustrates, as an example, seam welding of metal plates 100 and 102 along their margins. A pair of seam welding rolls 106 and 108 are moved relative to edges 100a and 102a of the metal plates 100 and 102 along a line 104 to be seamed (see dotted line in FIG. 7). In the meantime, electric current is continuously or intermittently supplied to the roller electrodes 106 and 108 to thereby seam weld the workpieces 100 and 102 along the line 104.

Seam welding may also be applied to sealing or encapsulating a tank 110, such as the one shown in FIG. 8. A pair of seam welding rolls 118 and 120 are moved relative to flanges or brims 112a and 114a of hat-like tank members 112 and 114 along a line 116 to be seamed (see dotted line in FIG. 8). In the meantime welding current is continuously or intermittently supplied to the welding electrodes 118 and 120 to thereby make the seam or joint 116.

Conventionally, the workpieces (100, 102), 110 are successively or constantly moved or translated by a feed gear whereas the seam welding rolls (106, 108, 118, 120) rotate around their axis.

During a seam welding operation, a resistance welding electric power supply apparatus supplies welding current to workpieces via welding electrodes, as mentioned above. The prior art inverter seam resistance welding electric power supply apparatus includes a feedback constant-current control feature which measures welding current on a cycle-by-cycle basis and controls it to be maintained at or near a desired level during a welding operation. The prior art apparatus, however, cannot successfully monitor or evaluate a quantity of welding current which is useful to determine the result of a weld or the quality of the seam welding. The reasons may be explained as follows:

The prior art apparatus employing a constant-current control measures welding current on an inverter switching cycle-by-cycle basis. The measured quantity or magnitude of welding current of a single switching cycle of the inverter contributes very little to weldability of seam welding. Thus, such a single cycle welding current value, as measured, does not carry useful information to reliably determine results of the welding. Going to an opposite extreme, one might propose an inverter seam welding resistance electric power supply apparatus which evaluates an average value of the entire welding current throughout a seam weld time. Such an entire current average value throughout the seam weld time, however, clearly disregards localities of seam welding, thus overlooking local defects of the seam weld since such a seam weld time is generally very long (for instance several minutes); much longer than a single spot weld time.

SUMMARY OF THE INVENTION

It is, therefore, an object of the invention to provide an inverter seam resistance welding electric power supply apparatus capable of determining weldability of seam welding by monitoring welding current involved therein, thus improving seam weld quality.

To achieve the object, a first inverter seam resistance welding electric power supply apparatus of the invention continuously or intermittently seam welds a pair of workpieces forming a seamlike welded line or lines. The apparatus includes monitor time interval preselecting means for subdividing a continuous seam weld time into preselected time intervals and for preselecting each time interval as a current monitor time interval. The apparatus also includes welding current measuring means for measuring welding current for each current monitor time interval. Finally, the apparatus includes first determining means for comparing a welding current value measured by the welding current measuring means for each current monitor time interval with a preselected monitoring value to thereby, determine that conforming or defective local welding has occurred for each current monitor time interval.

In addition to the above arrangement, a second inverter seam resistance welding power supply apparatus of the invention further includes current measuring means for measuring primary or secondary current of the apparatus for each switching cycle of the inverter and current evaluating means for evaluating, from the measured current from the current measuring means, an average, peak or effective current value thereof.

In addition to either the first or second arrangement, a third inverter seam resistance welding electric power supply apparatus of the invention further includes second determining means for determining defective seam weld when the first determining means has successively determined a defective local weld has occurred in a row for a succession of a predetermined number of current monitor time intervals.

In addition to the third arrangement, a fourth inverter seam resistance welding electric power supply apparatus of the invention further includes stop control means for stopping welding operation when the second determining means has determined that defective seam welding has occurred.

BRIEF DESCRIPTION OF THE DRAWINGS

The above, and other objects, features and advantages of the invention will become more apparent from the following description taken in conjunction with the drawings in which.

DETAILED DESCRIPTION OF PREFERRED EMBODIMENT

The invention will now be described in greater detail with respect to an illustrated embodiment by reference to FIG. 1 through 6.

Figure 1:
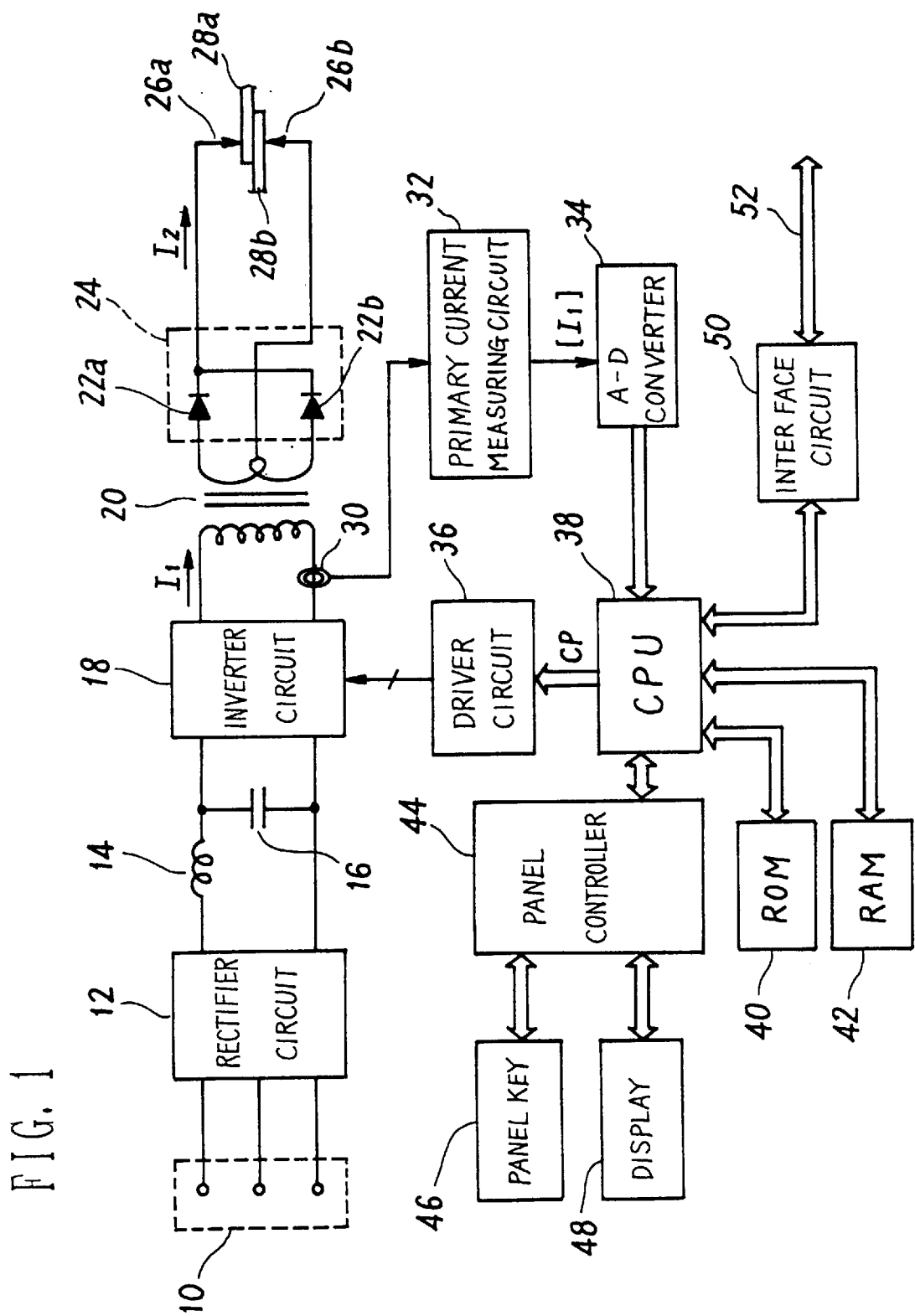
FIG. 1 is a block diagram of one embodiment of an inverter seam resistance welding electric power supply apparatus in accordance with the invention.
Figure 2:
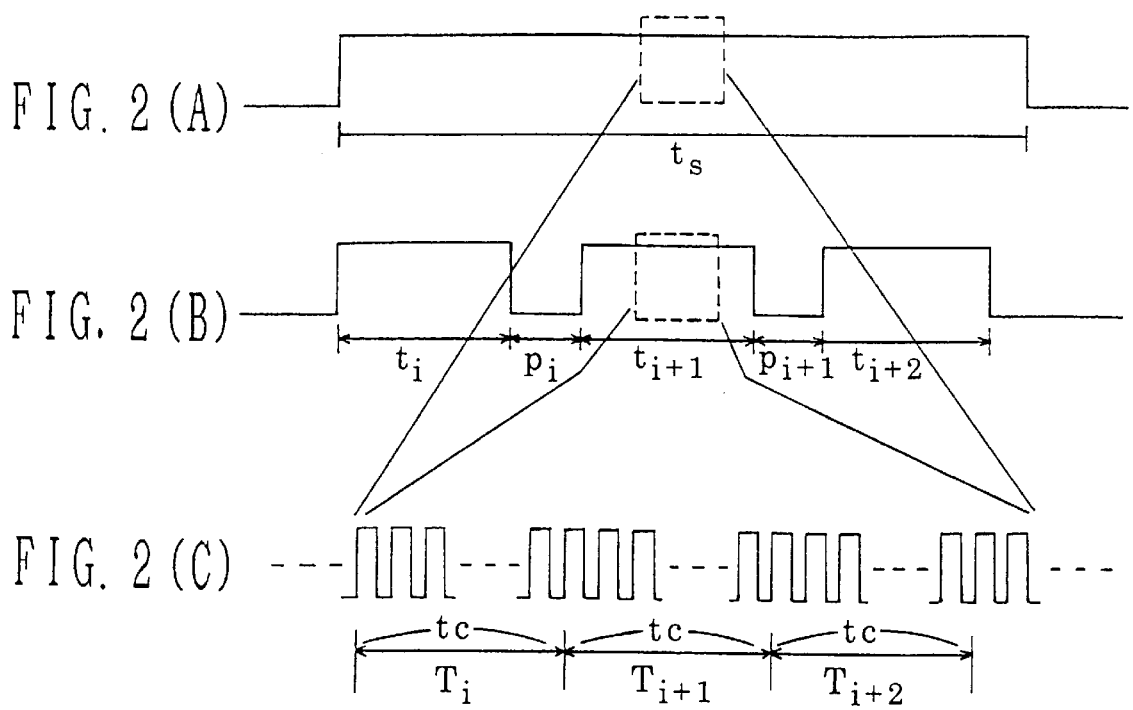
FIGS. 2(A) through 2(C) are time charts of a seam welding sequence in which each seam weld time is subdivided into preselected current monitor intervals in accordance with the invention.
Figure 7:
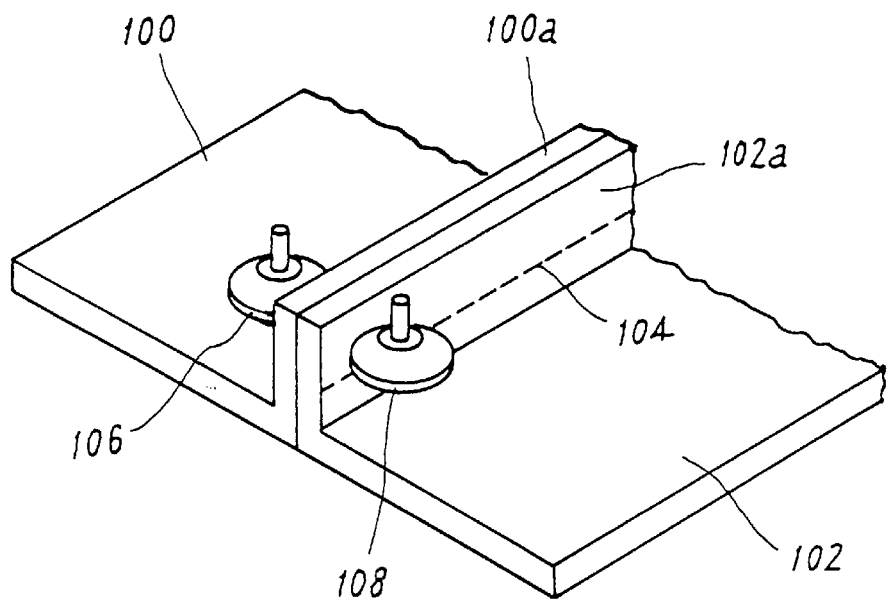
FIG. 7 is a perspective view of a seam welding application.
Figure 8:
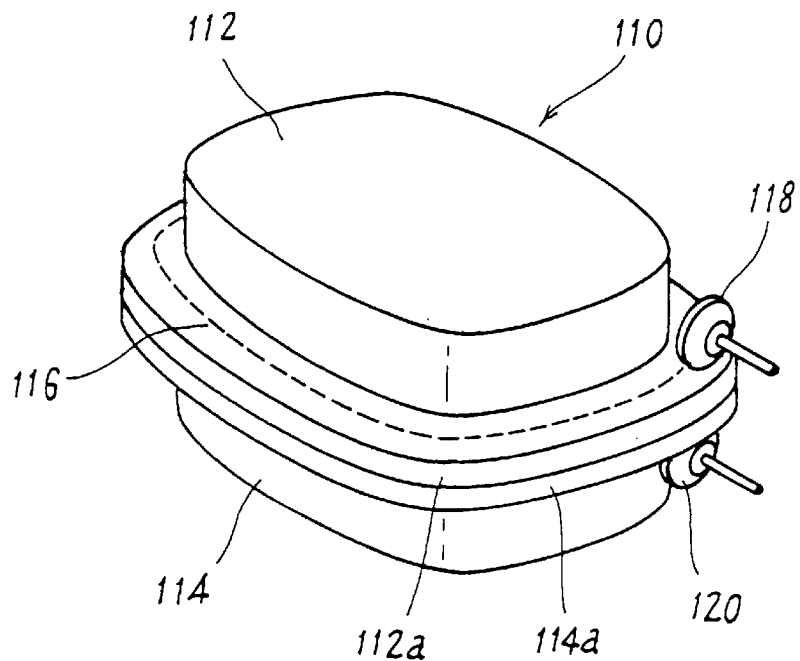
FIG. 8 is a perspective view of another seam welding application.

Referring first to FIG. 1, there is shown one embodiment of an inverter seam resistance welding electric power supply apparatus in accordance with the invention. The present apparatus can be applied to seam welding such as those shown in FIGS. 7 and 8.

In FIG. 1, a three-phase commercial AC electric power supply terminal 10 that receives a three-phase AC commercial electric power is connected to an input terminal of a rectifier circuit 12. The rectifier circuit 12 generates, at its output, rectified or DC current. A smoothing circuit including a coil 14 and a capacitor 16 smoothes the DC current. The smoothed DC current is supplied to an inverter circuit 18. The inverter circuit 18 includes switching elements, such as giant transistors (GTR), insulated gate bipolar transistors (IGBT) or the like, and switches the smoothed DC current into a high frequency (e.g., 4 kHz) AC current of pulses (rectangular waveforms). The switching operation of the inverter circuit 18 and, therefore, the pulse width of the high frequency AC output thereof is controlled by control pulses CP supplied from CPU 38 via an inverter driver circuit 36.

The high frequency AC output voltage from the inverter circuit 18 is applied across the primary coil of a welding transformer 20. The secondary coil of the welding transformer 20 induces a step-down high frequency AC voltage thereacross. The high frequency AC current from the secondary coil of the welding transformer 20 is supplied to a rectifier circuit 24 having a pair of diodes 22a and 22b. The rectifier circuit 24 converts the high frequency AC current into DC secondary current $I_2$ which flows through workpieces 28a and 28b via welding electrodes 26a and 26b.

A controller in the present power supply apparatus is constituted by a current sensor (e.g., Hall current transformer) 30, a primary current measuring or detecting circuit 32, an analog-to-digital converter 34, a CPU 38, an inverter driver circuit 36, a ROM 40, a RAM 42, a panel controller 44, a panel key 46, a display 48 and an interface circuit 50.

The current sensor 30 is provided in the primary circuit between the inverter circuit 18 output and the primary coil of the welding transformer 20 so as to surround a primary electric wire to generate a signal indicative of the waveform of the primary welding current $I_1$ or the derivative thereof. The primary current measuring circuit 32 determines or measures an effective current value of the primary current $I_1$ of each half or one cycle from the output signal of the current sensor 30. The measured value $[I_1]$ of the primary current in analog form obtained from the primary current measuring circuit 32 is converted into a corresponding digital signal by the analog-to-digital converter 34. The digitized signal of the measured current is received by CPU 38.

CPU 38 reads the measured current value $[I_1]$ of each cycle from the primary current measuring circuit 32 and compares it with a stored (registered) preselected current value [Is] to thereby compute the deviation of the measured current value. Based on the deviation, CPU 38 determines a next pulse width $W_{i+1}$ in order that the deviation will be cancelled. In the next cycle, CPU 38 generates a control pulse $CP_{i+1}$ having the pulse width $W_{i+1}$ thus determined.

The combination of the current sensor 30, primary current measuring circuit 32, analog-to-digital converter 34, CPU 38 and inverter driver circuit 36 defines a pulse width modulation (PWM) constant-current control circuit with a feedback loop that controls the switching of the inverter circuit 18 so that the primary current $I_1$ is generally maintained near the preselected current value [Is].

ROM 40 stores programs for controlling CPU 38. The stored programs include a control program for providing the constant-current control described above, a display program for providing a man-machine interface on the control panel, a key input routine, a communication program for data communication with an external device via the interface circuit 50, and so on.

RAM 42 stores various preselected values as registered data. Further RAM 42 temporarily stores measured results of welding operation, intermediate and final data from CPU 38. The contents of RAM 42 may be held by a backup battery. The panel controller 44 receives and transmits signals between CPU 38, and keys 46 and a display 48 (including, for example, liquid crystal flat panel display and LED indicators) disposed on the control panel.

The interface circuit 50 is connected to CPU 38 via an internal bus. The interface circuit 50 is also connected via a communication cable 52 to an external device such as a welding robot controller, weld start switch and/or welding schedule programming unit.

In the present embodiment, an input device such as the panel key 46 is used to enter those data required for a desired seam welding, such as seam weld time, selected current value, current monitor time interval, current monitoring value, criterior data, etc.

Seam welding is performed either in a continuous seam weld sequence in which welding is performed continuously without a pause or break, as shown in FIG. 2(a) or in an intermittent weld sequence in which welding is performed intermittently with pauses p, as shown in FIG. 2(b). For a continuous seam weld sequence, a single and entire seam weld time $t_s$ is preselected whereas, for an intermittent seam weld sequence, respective seam weld times $t_i$ and respective pause times $p_i$ are preselected.

A seam weld time of an intermittent seam weld sequence, not to mention that of a continuous seam weld sequence, is very long, for example, as many as 1000 cycles, much longer than a single spot weld time which is, for instance, as short as 10 cycles. In accordance with the invention, a seam weld time is subdivided into a plurality of constant or variable time intervals $t_c$ (e.g., the time of 20 cycles). Each subdivision defines a current monitor time interval, $T_i$, $T_{i+1}$, $T_{i+2}$, etc. as shown in FIG. 2(c). The determination of such a current monitor time interval T is done by CPU 38 when it has received selected data for a seam weld sequence from the input device. The current monitor time interval data as well as the selected data are registered into storage of RAM 42.

Figure 3:
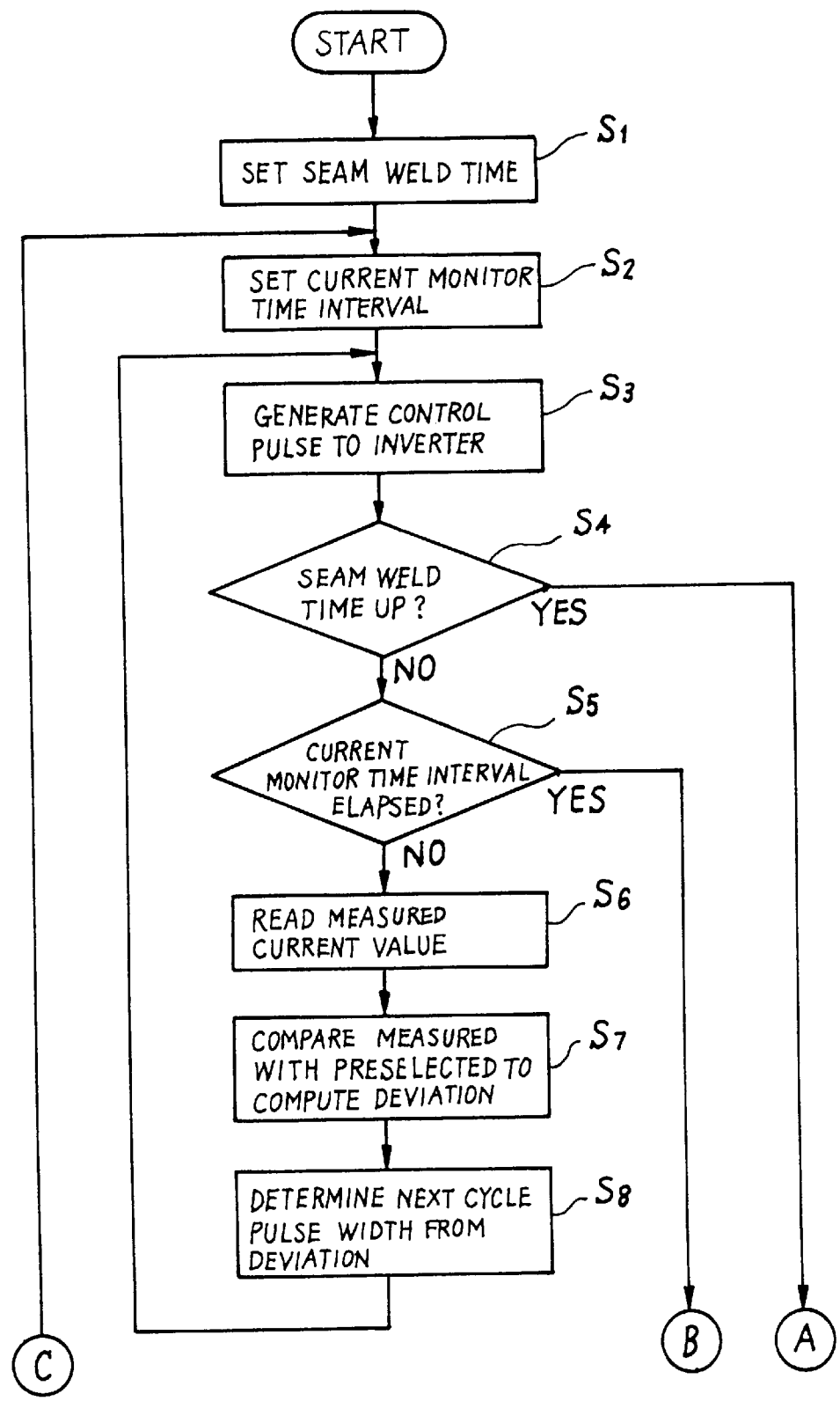
FIGS. 3 and 4 are flowcharts of a seam weld and monitor current routine executed by CPU in FIG. 1, showing an operation of the embodiment in accordance with the invention.
Figure 4:
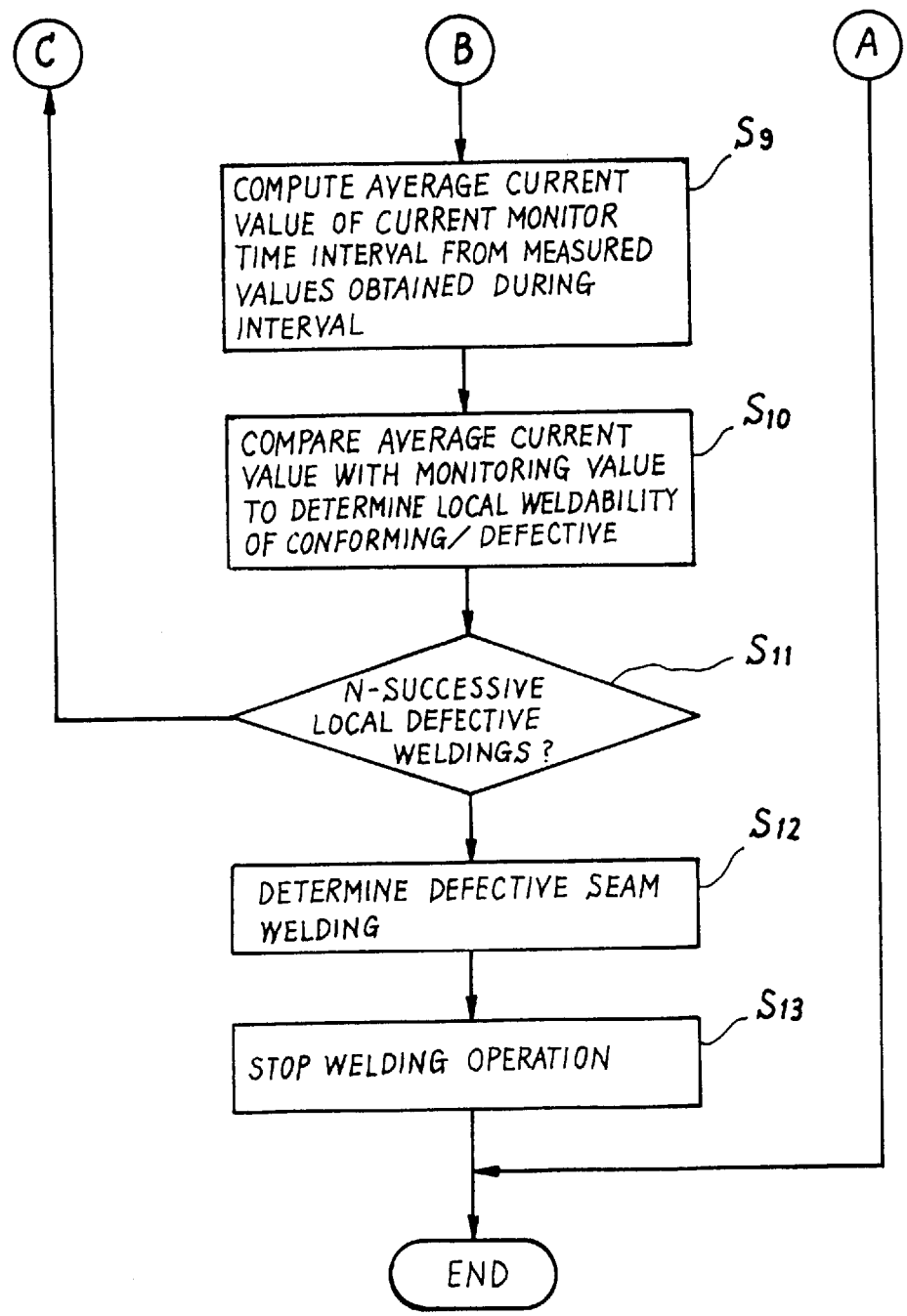

FIGS. 3 and 4 are flowcharts of a seam welding and monitor current routine, executed by CPU 38, showing an operation of the embodiment in accordance with the invention. This routine is called when CPU 38 has received a weld start signal from an external device via the interface circuit 50 or, when a pause time $p_i$ has elapsed in an intermittent seam weld sequence.

First, CPU 38 sets a timer to a seam weld time t (step $S_1$), and sets another timer to a first current monitor time interval T (step $S_2$). Then CPU 38 reads, from the storage of RAM 42, an initial pulse width $W_s$ as well as a preselected current value, and generates a first control pulse $CP_1$ having the initial pulse width $W_s$ (step $S_3$). Thus, in the first cycle, switching elements in the inverter circuit 18 are placed in an ON state for a time specified by the pulse width $W_s$ of the control pulse $CP_1$, so that the primary AC current $I_1$, and the secondary DC or welding current $I_2$ are generated.

The primary current $I_1$ of the first cycle is detected by the current sensor 30 and measured by the primary current measuring circuit 32 which thus provides an effective current value of the first cycle primary current $I_1$. CPU 38 reads the measured current value, i.e., the effective current value of the first cycle primary current, $[I_1]$ into storage at an appropriate timing (step $S_6$). Then CPU 38 compares the measured current value $[I_1]$ with the preselected current value $[I_s]$ to determine the deviation of the measured current value (step $S_7$), and from the deviation, determines or optimizes a next pulse width $W_2$ that will nullify the deviation (step $S_8$).

In the next or second cycle CPU 38 generates a second control pulse $CP_2$ having the pulse width $W_2$ (step $S_3$). Correspondingly, switching elements in the inverter circuit 18 are turned on for a time specified by the pulse width $W_2$ of the control pulse $CP_2$. Thus, the secondary current $I_2$ as well as primary current $I_1$ of the second cycle increases or decreases as compared with those of the first cycle.

Again, the primary current $I_1$ of the second cycle is measured as measured current value $[I_1]$ which is read by CPU 38 (step, $S_6$), and compared with the preselected current value $[I_s]$ to determine the deviation of the measured current from the preselected current (step $S_7$). The next pulse width $W_3$ is determined or optimized from the deviation (step $S_8$) Then, in the third cycle, CPU 38 generates a third control pulse $CP_3$ having the pulse width $W_3$ for current conduction (step $S_3$). CPU 38 repeats the process ($S_3$, $S_6$–$S_8$) of PWM constant-current control for any subsequent cycles until the seam weld time has elapsed (step $S_4$).

In accordance with the invention, the present embodiment performs a monitor current routine concurrent with the PWM constant-current control process. The monitor current routine or process is now described.

After the weld start, when the first current monitor time interval $T_1$ has elapsed (step $S_5$), CPU 38 collects, from the storage of RAM 42, measured current values $[I_1]$, $[I_2]$, etc., obtained during the first current monitor time interval, and computes an average current value $[I_{M1}]$ of the first current monitor time interval $T_1$ according to an averaging method such as an arithmetic mean method (step $S_9$).

Then CPU 38 compares the average current value $[I_{M1}]$ with monitoring data of, for example, an upper limit value $[I_U]$ and a lower limit value $[I_L]$. If the average current value $[I_{M1}]$, indicative of a quantity or magnitude of welding current of the first current monitor time interval, falls within the normal range between the upper and lower limit values $[I_U]$ and $[I_L]$, CPU 38 determines that a conforming local welding has occurred whereas it determines that a defective local welding has occurred if the value $[I_{M1}]$ goes out of the normal range (step $S_{10}$). After such a determination, CPU 38 sets the timer to a second current monitor time interval $T_2$ (step $S_2$).

In the case when the current averaging process of step $S_9$ and the local welding determining process of step $S_{10}$ consumes considerable time beyond a unit cycle time, for example, the current monitor time interval updating process of step $S_2$ may first be executed before executing the process of steps $S_9$ and $S_{10}$. In the alternative the process of steps $S_9$ and $S_{10}$ may be executed during the last cycle of the present current monitor time interval. In this case, the measured current value of the last cycle of the interval is excluded from the computation of the average current value. Such excluding, however, does not significantly affect the result of the local welding determination.

In this manner, on a current monitor time interval-by-interval basis, CPU 38 executes the current averaging process of step $S_9$ to evaluate a quantity or magnitude of welding current of each current monitor time interval $T_i$, $T_2$, $T_3$, etc., and also executes the local welding determination process of step $S_{10}$. If the local welding determination process has successively determined that defective local weldings have occurred in a row, as many as a predetermined number (for example three) of current monitor time intervals (step $S_{11}$), CPU 38 determines that a defective seam welding has occurred (step $S_{12}$). Having determined the occurrence of a defective seam welding, CPU 38 immediately stops or interrupts the operation of seam welding (step $S_{13}$).

In connection with the stopping of the seam welding operation in the event of defective seam welding, CPU 38 may provide an alarm message by means of the display 48 and/or signals through interface circuit 50 and communication cable 52 to an external device, such as a welding robot for moving or feeding the workpieces 28$a$ and 28$b$ to be seam-welded, to stop the operation. In doing so, a local point on the workpieces that has been determined defective by CPU 38 can immediately be identified and a proper action, such as re-welding defective point, can be taken.

In the alternative, when it has been determined that a defective seam welding has occurred at step $S_{12}$, CPU 38 may determine the physical location of the defective point on the workpieces, such as via an identification code or number of the current monitor time interval involved in the defective point, and record it into the storage of RAM 42. After the seam welding, CPU 38 may provide monitored results throughout the entire seam weld time by means of the display 48 according to, for instance, a format shown in FIG. 5 or by a printout via an external printer (not shown).

Figures 5, 6:
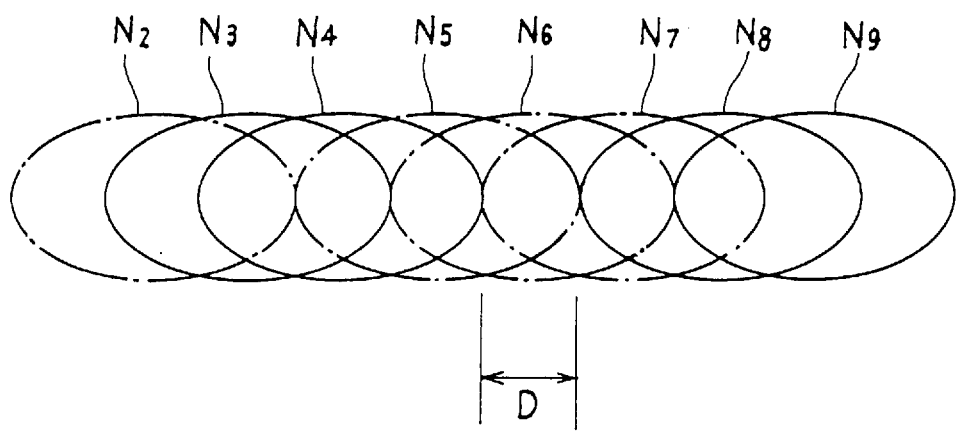
FIG. 5 is a table showing results of weld determinations for a succession of current monitor time intervals.
FIG. 6 is a schematic diagram of overlapped local weldings having a local defect, corresponding to monitored results shown in FIG. 5.

FIG. 6 schematically shows local weldability (conforming or defective) per current monitor time interval of seam welding. In the illustrated example, local weld points or areas $N_5$ to $N_7$, designated by closed chain lines and corresponding to fifth through seventh current monitor time intervals $T_5$ to $T_7$ have successively been found to be defective by the apparatus of the embodiment. Those local points or areas designated by closed solid lines have been found to be conforming. Thus, an area D is not covered by the conforming local weld points, and this area D is considered to be a defective point along a seam line produced by seam welding.

The criteria for defective seam welding may be varied as a function of the workpiece and specifications, and other welding conditions such as feeding velocity of workpieces. A current sensor 30 may be provided in the secondary circuit to measure secondary current $I_2$ rather than a primary current $I_1$, if desired.

In the above embodiment, the measured or monitored welding current of each current monitor time interval has been expressed or evaluated in an average value. Other evaluations, such as current peak value or effective current value may be employed to evaluate the welding current for checking local weldability of seam welding. CPU 38 may include a current computing or evaluating feature for computing an average, peak or effective current value of the welding current of each monitor time interval.

Whereas the electric power supply apparatus of the above embodiment has a pulse width modulation (PWM) constant-current control feature, the invention may be applied to any other suitable current control feature, such as a constant-current peak control feature employing a current peak or limiter control principle. In accordance with the principle of the current peak or limiter control, a current sensor is used to detect an instantaneous value or waveform of welding current. On an inverter cycle or half cycle-by-cycle basis, the peak or limiter control detects when the instantaneous value of current has reached a preselected reference level. Upon such detection, the peak or limiter control turns off the inverter circuit to thereby maintain current peaks during welding operation. Depending on variations in load and/or variations in supplied voltage, however, the effective current value may experience variations. The current monitoring technique of the invention can successfully be applied to such a constant-current peak control, thus improving the quality of seam welding.

In accordance with the invention, the quality of seam welding can be improved since the apparatus of the invention compares a welding current value of each current monitor time interval, including a number of inverter cycles and covering local point welding of the seam weld, with a current monitoring value to reliably determine local weldability of seam welding. In addition the apparatus of the invention analyzes a pattern of results of the determination per current monitor time interval to determine weldability of seam welding, further improving the quality of seam welding.

What is claimed is:

1. An inverter-type resistance welding electric power supply apparatus for supplying a welding current, through a welding transformer and a pair of seam welding electrodes, to a pair of workpieces in which the welding electrodes are contacted with and moved relative to the workpieces so that a seam-welded portion is formed in the workpieces, wherein the welding transformer includes a primary circuit with a primary coil and a secondary circuit, said power supply apparatus comprising:

a rectifier means for rectifying a commercial AC voltage into a DC voltage;

an inverter means for converting said DC voltage into a pulse-shaped voltage having a predetermined high frequency, and for supplying said pulse-shaped high frequency voltage to the primary coil of the welding transformer to supply the welding current;

a monitor time interval preselecting means for subdividing a seam weld time of a seam weld operation into a plurality of preselected time intervals such that each of said plurality of preselected time intervals consists of a plurality of inverter switching cycles, and for preselecting each of said plurality of preselected time intervals as a respective current monitor time interval;

a current measuring means for measuring a value of a current flowing in the primary or secondary circuit of the welding transformer during each current monitor time interval;

a first determining means for comparing the current value measured by said current measuring means for each current monitor time interval with a preselected monitoring value to determine, for each current monitor time interval, whether a resulting weld corresponding to the respective current monitor time interval is conforming or defective;

a second determining means for determining that a resulting seam weld is defective when said first determining means has successively determined that a defective weld has occurred for a predetermined number of successive current monitor time intervals.

2. The inverter-type resistance welding electric power supply apparatus as claimed in claim 1, wherein said current measuring means comprises:

a current evaluating means for evaluating, from the current values measured during the current monitor intervals, an average, peak, or effective current value.

3. The inverter-type resistance welding electric power supply apparatus as claimed in claim 2, further comprising:

a stop control means for stopping the seam welding operation when said second determining means has determined that the resulting seam weld is defective.

4. The inverter-type resistance welding electric power supply apparatus as claimed in claim 1, further comprising:

a stop control means for stopping the seam welding operation when said second determining means has determined that the resulting seam weld is defective.

* * * * *